（12) United States Patent
Balasubramanian et al.

(10) Patent No.: US 11,317,325 B2
(45) Date of Patent: Apr. 26, 2022

(54) CALL SETUP TIME IN LOADED IMS NETWORKS

(71) Applicant: APPLE INC., Cupertino, CA (US)

(72) Inventors: Sundarraman Balasubramanian, Paris (FR); Vijay Venkataraman, San Jose, CA (US); Nordine Kadri, Paris (FR); Alistair McFarlane, London (GB)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 15/994,250

(22) Filed: May 31, 2018

(65) Prior Publication Data

US 2019/0373515 A1   Dec. 5, 2019

(51) Int. Cl.
*H04W 36/00*   (2009.01)
*H04L 29/06*   (2006.01)
*H04W 76/18*   (2018.01)
*H04L 12/26*   (2006.01)
*H04W 36/26*   (2009.01)
*H04L 65/1016*   (2022.01)
*H04L 65/1069*   (2022.01)
*H04L 43/16*   (2022.01)
*H04W 60/00*   (2009.01)

(52) U.S. Cl.
CPC ......... *H04W 36/0022* (2013.01); *H04L 43/16* (2013.01); *H04L 65/1016* (2013.01); *H04L 65/1069* (2013.01); *H04W 36/26* (2013.01); *H04W 76/18* (2018.02); *H04W 60/00* (2013.01)

(58) Field of Classification Search
CPC . H04W 36/0022; H04W 76/18; H04W 36/26; H04W 60/00; H04L 43/16; H04L 65/1016; H04L 65/1069
See application file for complete search history.

(56) References Cited

U.S. PATENT DOCUMENTS

| | | | |
|---|---|---|---|
| 6,215,782 B1 * | 4/2001 | Buskens | H04W 76/10 370/350 |
| 7,978,599 B2 * | 7/2011 | Stone | H04L 43/16 370/229 |
| 8,213,295 B2 * | 7/2012 | Ginde | H04L 67/145 370/216 |
| 8,380,207 B2 * | 2/2013 | Tong | H04W 36/0022 455/444 |

(Continued)

*Primary Examiner* — Huy D Vu
*Assistant Examiner* — Bailor C. Hsu
(74) *Attorney, Agent, or Firm* — Fay Kaplun & Marcin, LLP

(57) ABSTRACT

A device, system, and method improve a call setup time. The method is performed at a device configured to establish first and second network connections where the second network performs circuit switched voice calls. The method includes receiving a call input to perform a call and determining whether the device is registered with a first feature to perform the call based on an Internet Protocol (IP). When the device is registered with the first feature, the method includes determining whether timeouts for attempting previous IP calls is greater than a threshold. When the timeouts are at least the threshold, the method includes deregistering from the first feature and performing a circuit switched fallback (CSFB) procedure including a handover from the first network to the second network. The method includes performing the call as a circuit switched call.

20 Claims, 6 Drawing Sheets

(56) References Cited

U.S. PATENT DOCUMENTS

| | | | | |
|---|---|---|---|---|
| 8,619,547 B2* | 12/2013 | Qiu | ................... | H04L 65/1073 |
| | | | | 370/216 |
| 8,705,445 B2* | 4/2014 | Watfa | ............... | H04W 36/0022 |
| | | | | 370/328 |
| 9,942,803 B2* | 4/2018 | Ng | .................. | H04W 36/0022 |
| 2011/0002267 A1* | 1/2011 | Dwyer | ................ | H04W 48/18 |
| | | | | 370/328 |
| 2011/0195714 A1* | 8/2011 | Sawinathan | ........ | H04W 60/005 |
| | | | | 455/435.1 |
| 2012/0039167 A1* | 2/2012 | Swaminathan | ....... | H04W 76/16 |
| | | | | 370/225 |
| 2015/0163701 A1* | 6/2015 | Yenamandra | ......... | H04W 36/30 |
| | | | | 370/332 |
| 2015/0334588 A1* | 11/2015 | Cui | .................. | H04W 36/0079 |
| | | | | 370/252 |
| 2016/0353344 A1* | 12/2016 | Deivasigamani | ..... | H04W 36/14 |

\* cited by examiner

--PRIOR ART--

--PRIOR ART--

CALL SETUP TIME IN LOADED IMS NETWORKS

BACKGROUND INFORMATION

A user equipment (UE) may be configured to establish a connection to at least one of a plurality of different networks or types of networks as well as with other UEs to perform a variety of different functionalities via the connection. For example, the UE may connect to a first type of network (e.g., Long Term Evolution (LTE) network) to communicate with a further UE through the network connection (e.g., a user of the UE may perform a voice call or transmit a text to another user of another UE). In establishing a communication pathway with the further UE, the UE may utilize a plurality of different calling applications. For example, the calling applications may utilize a circuit switched call or a voice over Internet Protocol (IP) (VoIP) such as voice over LTE (VoLTE).

The VoLTE call provides various benefits for the networks that establish calls and the users performing the calls. For example, the VoLTE call may allow more voice and/or data to be transmitted within a given time period. In another example, the VoLTE call may utilize less bandwidth than other VoIP calls. In a further example, the VoLTE call does not rely on the legacy circuit switched voice network. To complete a VoLTE call, an IP Multimedia Subsystem (IMS) may be used. In scenarios where the IMS fails to establish the call, a protocol used by the UE is to reregister with the IMS and utilize a fallback procedure for the call to be performed using the circuit switched voice network (e.g., a circuit switched fallback procedure (CSFB)). This process may require a relatively substantial amount of time that may impact a user experience. When the UE is situated where a connection path to the IMS (e.g., a loaded IMS) results in the IMS continuously failing to establish a call, the user may constantly experience these long setup times to establish a call.

SUMMARY

The exemplary embodiments are directed to a method of improving a call setup time. The method is performed at a device that is configured to establish a first network connection to a first network and a second network connection to a second network, the second network configured to perform circuit switched voice calls. The method includes receiving a call input to perform a call. The method includes determining whether the device is registered with a first feature of the first network. The first feature is configured to perform the call based on an Internet Protocol (IP). When the device is registered with the first feature, the method includes determining whether a number of timeouts for attempting previous calls based on the IP is greater than a threshold. When the number of timeouts is at least the threshold, the method includes deregistering from the first feature. The method includes performing a circuit switched fallback (CSFB) procedure including a handover from the first network to the second network. The method includes performing the call as a circuit switched call.

The exemplary embodiments are directed to a device that improves a call setup time. The device includes a transceiver and a processor. The transceiver is configured to establish a first network connection to a first network and a second network connection to a second network. The second network is configured to perform circuit switched voice calls. The processor receives a call input to perform a call. The processor determines whether the device is registered with a first feature of the first network. The first feature is configured to perform the call based on an Internet Protocol (IP). When the device is registered with the first feature, the processor determines whether a number of timeouts for attempting previous calls based on the IP is greater than a threshold. When the number of timeouts is at least the threshold, the processor deregisters from the first feature. The processor performs a circuit switched fallback (CSFB) procedure including a handover from the first network to the second network. The processor performs the call as a circuit switched call.

The exemplary embodiments are directed to a method of improving a call setup time. The method is performed at a device that is configured to establish a first network connection to a first network and a second network connection to a second network, the second network configured to perform circuit switched voice calls. The method includes receiving a call input to perform a call. The method includes determining whether the device is registered with a first feature of the first network, the first feature configured to perform the call based on an Internet Protocol (IP). When the device is registered with the first feature, the method includes determining whether a number of timeouts for attempting previous calls based on the IP is greater than a threshold. When the number of timeouts is at least the threshold, the method includes deregistering from the first feature and starting a delay timer. The delay timer prevents the device from registering to the first feature. The method includes performing a circuit switched fallback (CSFB) procedure including a handover from the first network to the second network. The method includes performing the call as a circuit switched call. Upon completion of the circuit switched call, the method includes connecting to the first network. The method includes determining whether the delay timer is running. When the delay timer is running, the method includes preventing the device from registering with the first feature.

DETAILED DESCRIPTION

Figure 1:
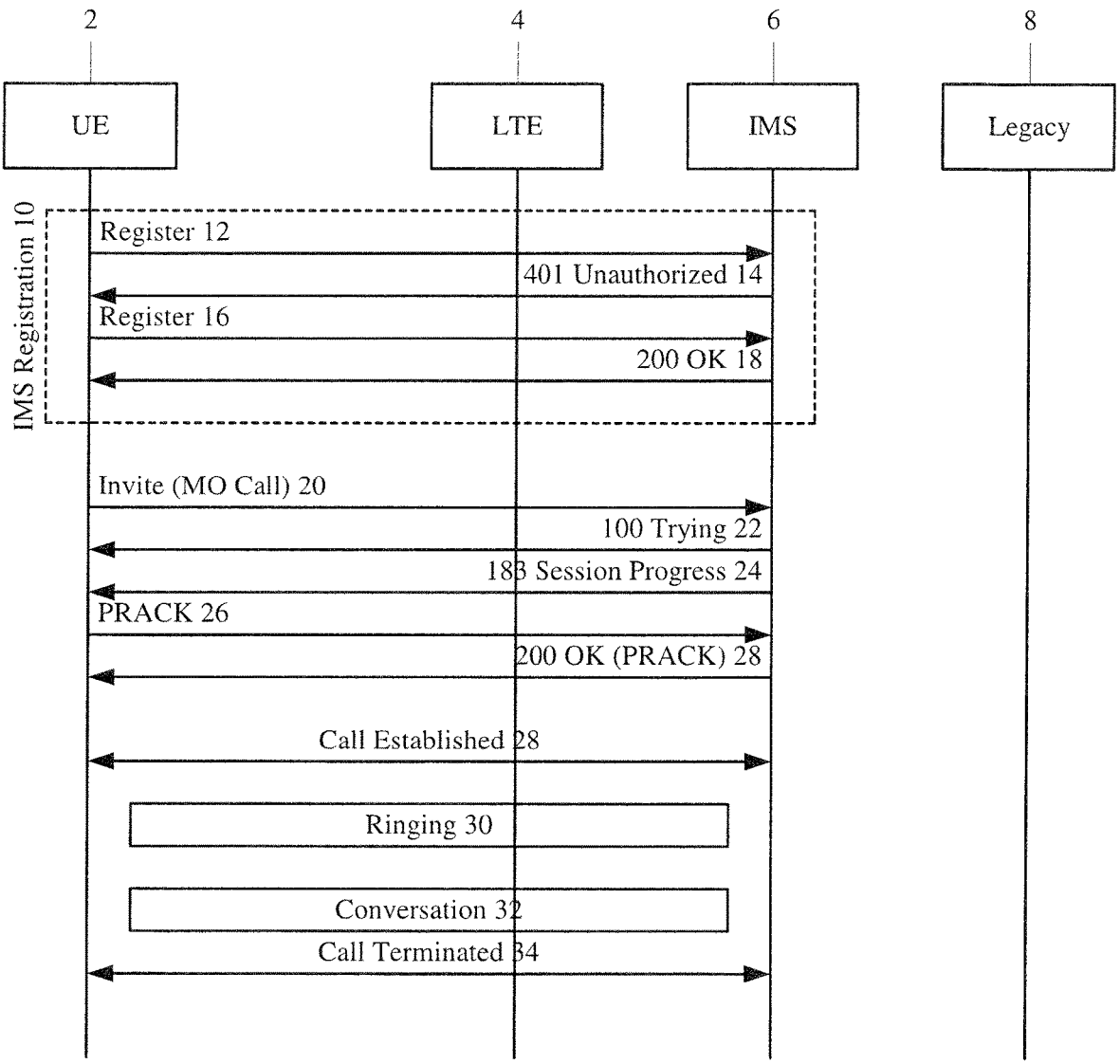
FIG. 1 shows an exemplary signal diagram when a call is successfully established according to various exemplary embodiments described herein.

The exemplary embodiments may be further understood with reference to the following description and the related appended drawings, wherein like elements are provided with the same reference numerals. The exemplary embodiments are related to a device, system, and method for improving the manner in which calls are established by a user equipment (UE). During irregular network behavior, there may be a relatively long call setup time that is observed when performing a call using Internet Protocol (IP) and using a circuit switched fallback procedure. Accordingly, the exemplary embodiments provide a mechanism that reduces a call setup time and improves device performance during irregular network behavior. As will be described in detail below, the mechanism according to the exemplary embodiments may utilize a timeout counter and a delay timer to modify and/or bypass select operations resulting in a call setup time being reduced.

Initially, it is noted that the exemplary embodiments are described with regard to a UE. However, the UE is only exemplary. The exemplary embodiments may be utilized with any device that may connect to a network used in establishing a call with another UE as well as be configured with the hardware, software, and/or firmware to establish the connection and utilize the mechanism according to the exemplary embodiments. Therefore, the UE as described herein is used to represent any device capable of establishing these connections.

It is also noted that the exemplary embodiments are described with regard to irregular network behavior or irregular network conditions being experienced by a UE that causes a call setup time to be longer than under regular network conditions. For illustrative purposes, the irregular network conditions are described as a loaded network feature such as an IP Multimedia Subsystem (IMS). However, those skilled in the art will understand that there may be one or more different factors that may contribute to irregular network conditions such that the mechanism according to the exemplary embodiments may be utilized. Therefore, the loaded IMS may represent one or more factors that result in the irregular network conditions.

The exemplary embodiments are also described with regard to a Long Term Evolution (LTE) network and a Voice over LTE (VoLTE) call in which an IMS is used to perform the VoLTE call along with a circuit switched fallback (CSFB) procedure when the VoLTE call is not capable of being established or the VoLTE call is not available. However, the network type, the call type, the use of the IMS, and the CSFB are only exemplary. For example, the call may be any type including voice over IP, voice over WiFi, etc. The exemplary embodiments may be implemented and/or modified for any process in which a first feature is being attempted, a second feature may be used as a secondary approach, and one or more operations in the first feature may be modified to reach the second feature in a more expeditious manner for subsequent uses of the process.

The exemplary embodiments are directed to when a first user using a first UE calls a second user using a second UE. When the first UE is connected to an IMS at the time the call is made, the first UE may attempt to perform the call as a VoLTE call over a LTE network. When the first UE attempts to perform the call as the VoLTE call but the VoLTE call fails from the IMS being unavailable, the first UE may subsequently perform the call using a CSFB procedure through the LTE network so that the circuit switched call is used over the legacy network. When the first UE is not connected to the IMS at the time the call is made, the first UE may perform the call as a circuit switched call over a legacy network via the CSFB procedure.

Initially, the VoLTE call procedure may entail a plurality of operations that are performed initially, during, and after the VoLTE call is performed. FIG. 1 shows an exemplary signal diagram 100 when a call is successfully established as a VoLTE call according to various exemplary embodiments described herein. The signal diagram 100 is described with regard to a UE 2, a LTE network 4, an IMS 6, and a legacy network 8. As the VoLTE call is successful in the signal diagram 100, the legacy network 8 may not participate in this exemplary flow. The signal diagram 100 shows a direct exchange between the UE 2 and the IMS 6. However, those skilled in the art will understand that the UE 2 is capable of communicating with the IMS 6 via the LTE 4. Therefore, the exchange between the UE 2 and the IMS 6 may include a forwarding functionality performed by the LTE 4 (not shown).

An initial process that is performed is the UE 2 registers with the IMS 6. For example, upon connecting to the LTE network 4 or upon an event occurring (e.g., an area update), the UE 2 may register or reregister with the IMS 6. Those skilled in the art will understand the plurality of operations that are performed for the IMS registration procedure to be completed for the UE 2 to be registered with the IMS 6. As illustrated in FIG. 1, an IMS registration procedure 10 may include the UE 2 transmitting a register request 12 to the IMS 6. The IMS 6 may respond with a 401 unauthorized response 14. This exchange may entail the UE 2 attempting to IMS register but is challenged by the IMS 6 to authenticate itself. The UE 2 may then transmit another register request 16 to the IMS 6. The IMS 6 may respond with a 200 OK response 18 which completes the IMS registration 10. This exchange may entail the UE 2 establishing a protected session with the IMS 6 for another attempt at registering to be performed. Thereafter, the UE 2 is registered with the IMS 6.

It is noted that the above IMS registration procedure 10 is a general summary of select operations that are performed. Those skilled in the art will understand that there may be a plurality of other operations that are performed in the IMS registration 10. For example, in the initial attempt to register with the IMS, the IMS registration procedure may include a proxy call session control function (CSCF) (P-CSCF) and a serving CSCF (S-CSCF). The UE 2 may request a dynamic host configuration protocol (DHCP) server and additionally request a domain name and/or IP address of a P-CSCF as well as domain name system (DNS) servers. By performing a DNS query, a list of P-CSCF IP addresses may be retrieved and one of these IP addresses may be selected which initiates communication with the IMS 6. Thereafter, once the UE 2 attaches to the IMS 6, a S-CSCF may be assigned to serve the UE 2. The S-CSCF may retrieve a profile of the UE 2 (or the user of the UE 2) who has an IMS subscription. A subsequent attempt to register with the IMS may be performed to result in the UE 2 registering with the IMS 6.

Once the UE 2 has registered with the IMS 6, the UE 2 may utilize the various features that the IMS 6 may provide. A particular feature that may be used is performing a VoLTE call. Accordingly, at a subsequent time, the UE 2 may receive a mobile originating (MO) call input from a user (e.g., a public switched telephony network (PSTN) phone number). Since the UE 2 is registered with the IMS 6, the call may be performed as a VoLTE call. Therefore, the UE 2 may transmit an invite 20 to the P-CSCF of the IMS 6 including data such as a called party and corresponding information (e.g., available codecs, a real-time transport protocol (RTP) port number, an IP address, etc.). The P-CSCF of the IMS 6 may respond by acknowledging the invite 20 with a 100 trying message 22. Additionally, the IMS 6 may transmit a 183 session progress 24 with network carrying media stream capabilities of the destination along the signaling path, a media gateway (IM-MGW) common codec list, an IP address, a RTP port number, etc. The UE 2 may then confirm the codec selection in a provisional response ACK (PRACK) 26 to which the IMS 6 acknowledges the selected codec in a 200 OK 28. Upon completion of these operations, a call may be established 28. Once established, the call may be performed such as ringing 30 the mobile terminating (MT) UE and allowing a conversation 32 (if a user of the MT UE answers the call). Once the call is completed, the call may be terminated 34.

The above process in the signal diagram 100 of FIG. 1 illustrates when a VoLTE call is successfully established and performed until the call is terminated (regardless of whether the conversation 30 takes place). With the call being completed over the LTE network 4, the UE 2 remains connected to the LTE network 4 after the call has terminated 34. However, there are scenarios when the VoLTE call fails. For example, after transmitting the invite 20, there may be a window in which the 100 trying message 22 is to be received that results in a timeout. The window may vary in size based on a variety of factors (e.g., a global region, network capabilities, etc.). In a particular example, a maximum window may be up to 32 seconds.

Figure 2:
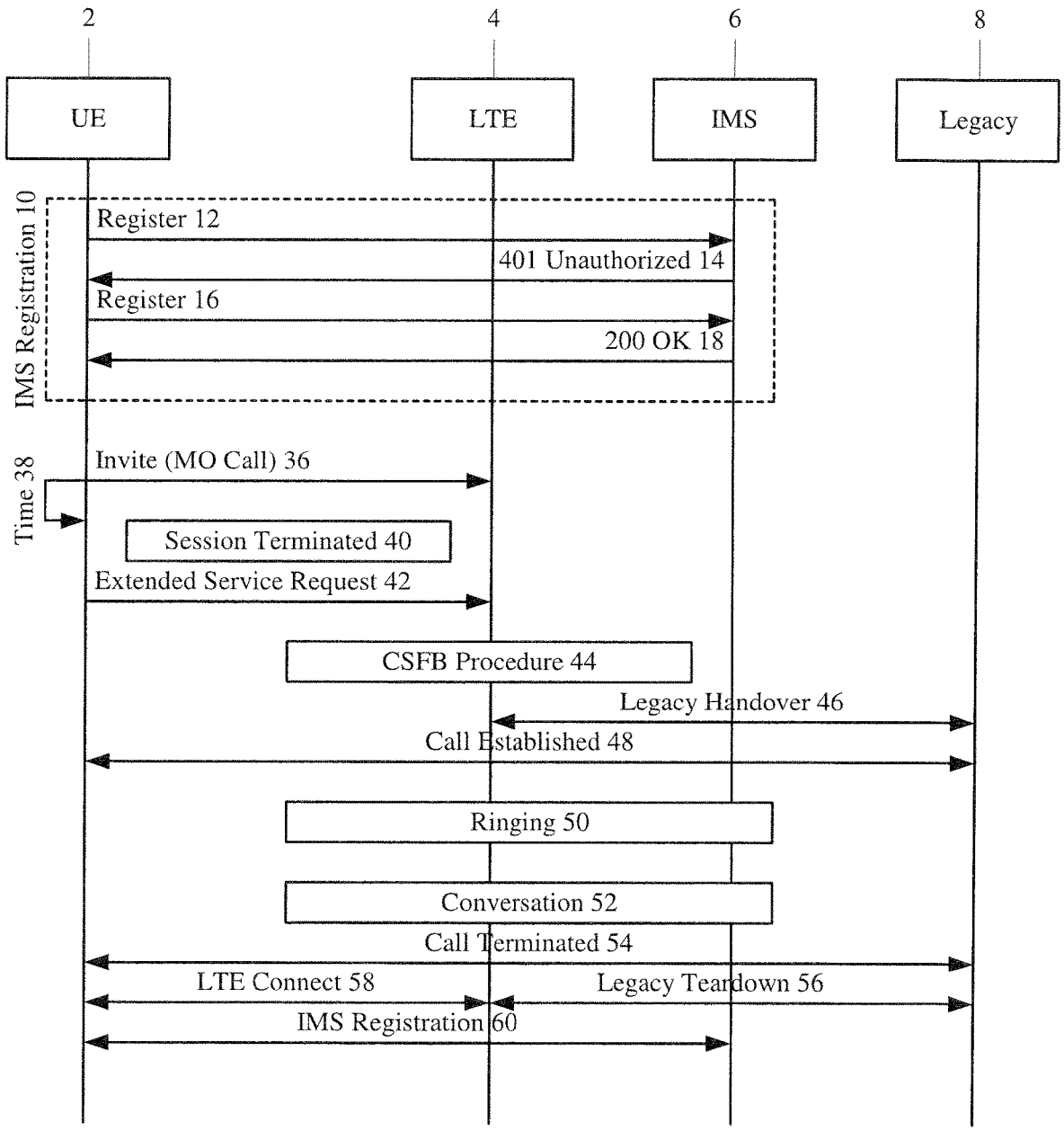
FIG. 2 shows an exemplary signal diagram when a call is established using a fallback procedure according to various exemplary embodiments described herein.

FIG. 2 shows an exemplary signal diagram 200 when a call is established using a fallback procedure according to various exemplary embodiments described herein. The signal diagram 200 is also described with regard to the UE 2, the LTE network 4, the IMS 6, and the legacy network 8. The signal diagram 200 relates to a scenario when an initial VoLTE call attempt fails from failure to receive the 100 trying message within the window after transmitting the invite and a CSFB procedure is used. The signal diagram 200 may start in a substantially similar manner as the signal diagram 100. Specifically, the IMS registration 10 may be performed in which the UE 2 registers with the IMS 6. Once registered, the UE 2 may perform a call using a VoLTE call. It is again noted that the signal diagram 200 shows a direct exchange between the UE 2 and the IMS 6 but that the exchange between the UE 2 and the IMS 6 may include a forwarding functionality performed by the LTE 4 (not shown).

In performing the VoLTE call, again, the UE 2 may transmit an invite 36 to the IMS 6 including the data noted above. However, in this instance, a time 38 may pass where the time 38 corresponds to the window in which the 100 trying message is to be received from the IMS 6. Due to certain network implementations, there may be occasions when the IMS 6 does not respond to the invite resulting in a call establishment failing and/or a substantial call setup time being observed. Specifically, the window must lapse for subsequent operations to be performed, if a remaining time after the window lapsing allows for the subsequent operations. For example, in France, an invite response timeout value may be set to 3,000 ms by certain networks. Due to this invite response timeout value, once the invite response timeout occurs, the UE 2 may still perform a CSFB procedure. Accordingly, the UE 2 which is IMS registered may initially send an invite to establish a VoLTE call. However, since there is no response from the IMS 6, the UE 2 attempts to complete the call through the CSFB procedure and using a circuit switched call. This process may require between 8 to 10 seconds from the VoLTE call being attempted and subsequently the circuit switched call being attempted. In other countries, the invite response timeout value may be set higher than France such that the invite response timeout occurring may result in no further operations being performed. As a result, in these other regions, the call being established at all is very low when the VoLTE call fails. With higher invite response timeout values, by the time the session gets terminated between the UE 2 and the IMS 6, the UE 2 may not perform any further attempts to complete the call, even forgoing the CSFB procedure.

It is noted that the CSFB procedure may be used for any of a variety of reasons in which a corresponding event triggers the CSFB procedure. For illustrative purposes, the exemplary embodiments are described with regard to the CSFB procedure being triggered when the invite response timeout occurs. However, the exemplary embodiments may be implemented and/or modified with other reasons that the CSFB procedure is triggered.

Returning to the signal diagram 200, since the 100 trying message is not received within the time 38, the session may be terminated 40. When the session is terminated 40, the UE 2 is still connected to the LTE network 4. Accordingly, the UE 2 may transmit an extended service request 42 to the LTE 4. As those skilled in the art will understand, the extended service request 42 may be a message sent by the UE 2 to the LTE 4 to initiate the CSFB procedure. Subsequently, the LTE 4 may perform the CSFB procedure 44 for the UE 2 to perform the call as a circuit switched call. As illustrated, by using the CSFB procedure 44, there may be a legacy handover 46 in which the UE 2 is associated with the legacy network 8. Thereafter, the call may be stablished 48 where the call is performed as a circuit switched call. The call may then be established 48, ringing 50 may be performed, a conversation 52 may be performed (assuming the MT user answers the call), and the call may be terminated 54. After the circuit switched call is terminated, the UE 2 may return to the LTE network. Thus, there may be a legacy teardown 56 and a LTE connect 58 that is performed. Upon returning to the LTE 4, the UE 2 may again register with the IMS 6 using the IMS registration 60 which is substantially similar to the IMS registration 10.

It is noted that the above set of operations in which the CSFB procedure is used is based on an assumption that the LTE 4 is configured to provide this feature. As those skilled in the art will understand, the CSFB procedure may be provided when there is a bridge between the LTE 4 and the legacy network 8 over which the circuit switched call would be performed. Specifically, an interface (e.g., SGs interface) may connect a mobility management entity (MME) of the LTE 4 to a mobile switching center (MSC) of the legacy network 8. Thus, upon receiving the extended service request 42, the LTE 4 may use the SG interface for the CSFB procedure to be performed and the circuit switched call to be performed (e.g., without any user intervention) by the legacy network 8. However, if the SG interface or bridge is unavailable, the call may be required to be performed as a VoLTE call.

As noted above, the call setup time that is required under irregular network conditions (e.g., a loaded IMS) may be substantially long. For example, to establish a call, the operations that are performed may use 8 to 10 seconds before a user hears ringing (indicating that the MT user is being contacted). Again, the operations may include a first set of operations used in attempting to perform a VoLTE call and a second set of operations used in attempting to perform a circuit switched call when the VoLTE call fails. The CSFB procedure may allow for the call to be established but the overall call establishment procedure may benefit from using the circuit switched call at an earlier opportunity to reduce the time to establish the call, rather than use the first set of operations to perform the VoLTE call under conditions when the VoLTE call likely fails (e.g., eliminate the window in waiting for the 100 trying message from the IMS). For example, when the UE is in a location where the IMS may not be capable of establishing a VoLTE call, each instance that a user attempts to place a call while registered to the IMS may result in this extended call setup time where the circuit switched call is ultimately used. For example, a first call may utilize 8 to 10 seconds to establish a call which is ultimately circuit switched. After the call, the UE returns to the LTE network (from the legacy network) and registers with the IMS. A second, subsequent call may again utilize 8 to 10 seconds to establish a call (e.g., from first attempting the VoLTE call since the UE is IMS registered) which also ultimately is circuit switched. This extended call setup time may continue until the conditions of the UE or the IMS changes (e.g., area change).

In view of the extended call setup time under irregular network conditions, the exemplary embodiments provide a mechanism to reduce the call setup time in establishing a call by bypassing the VoLTE call attempt and utilizing the circuit switched call. That is, the CSFB procedure may be used without the operations used in attempting the VoLTE call (e.g., the window to receive the 100 trying message). Specifically, the exemplary embodiments introduce a timeout counter that defines when a delay timer is to be used. The timeout counter indicates a threshold of instances that a timeout occurs from attempting the VoLTE call in previous iterations. The irregular network conditions being experienced may be indicated from the threshold being met. Accordingly, the delay timer may be started so that subsequent calls may be attempted immediately with the CSFB procedure. The call that triggered the delay timer may also immediately use the CSFB procedure by deregistering with the IMS to bypass the VoLTE call attempt. The delay timer defines when a UE may register with the IMS. By postponing when the UE registers with the IMS after a call has been completed, the UE may remain unregistered with the IMS such that the VoLTE call is not an option and the CSFB procedure is used at an earlier opportunity for the circuit switched call to be used while the irregular network conditions persist.

Figure 3:
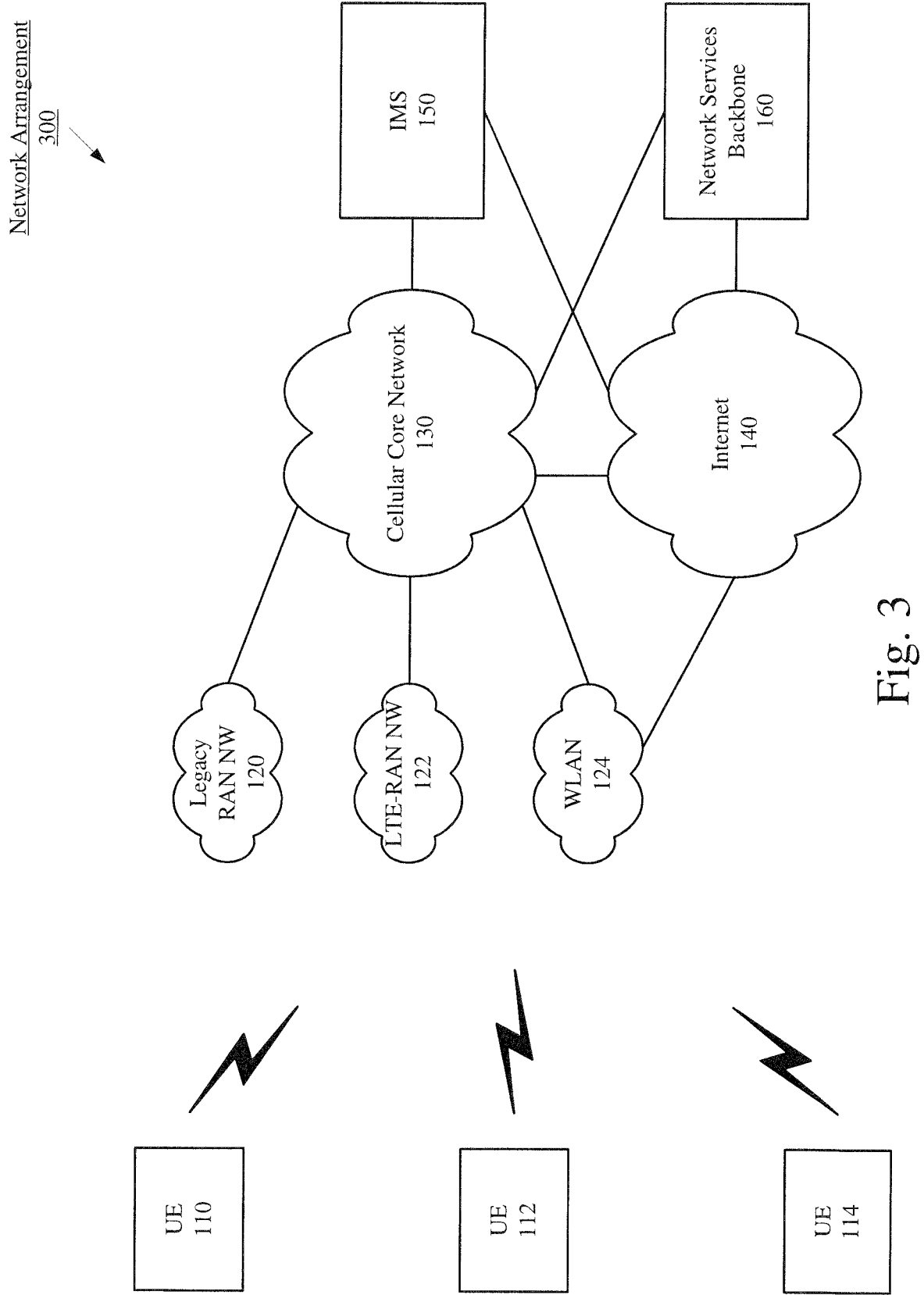
FIG. 3 shows an exemplary network arrangement according to various exemplary embodiments described herein.

FIG. 3 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate with one or more networks. In this example, the networks with which the UEs 110-114 may communicate are a legacy radio access network (RAN) 120, a LTE RAN (LTE-RAN) 122, and a wireless local area network (WLAN) 124. In this example, each of the networks 120-124 is a wireless network with which the UEs 110-114 may communicate wirelessly. However, it should be understood that the UEs 110-114 may also communicate with other types of networks using a wired connection. With regards to the exemplary embodiments, the UEs 110-114 may establish a connection with the LTE-RAN 122 to perform VoLTE calls with other UEs. For example, the UEs 110-114 may have a LTE chipset to communicate with the LTE-RAN 122. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. Examples of the legacy RAN 120 may include those networks that are generally labeled as 2G and/or 3G networks and may include circuit switched voice calls and packet switched data operations. The legacy RAN 120 may be used for circuit switched calls. For example, the legacy RAN 120 may include a 2G network in which a Global System for Mobile Communications (GSM) is used or a 3G network in which a Universal Mobile Telecommunications System (UMTS) is used. The LTE-RAN 122 may be used to perform Voice over IP (VoIP) calls, specifically VoLTE calls. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.).

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140. The network arrangement 100 may further include bridges or a SG interface that connects the LTE-RAN 122 and the legacy RAN 120.

The network arrangement 100 also includes an IMS 150. The IMS 150 may be generally described as an architecture for delivering multimedia services to the UEs 110-114 using the IP protocol such as VoLTE calls. The IMS 150 may include a variety of components to accomplish this task. For example, a typical IMS 150 includes a Home Subscriber Server (HSS) that stores subscription information for a user of the UEs 110-114. This subscription information is used to provide the correct multimedia services to the user such as the VoLTE call. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party.

Thus, the network arrangement 100 allows the UEs 110-114 to perform functionalities generally associated with computers and cellular networks. For example, the UEs 110-114 may perform the VoLTE calls to other parties, may browse the Internet 140 for information, may stream multimedia data to the UEs 110-114, etc.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network services backbone 160 may be provided by any entity or a set of entities. In one example, the network services backbone 160 is provided by the supplier of one or more of the UEs 110-114. In another example, the network services backbone 160 is provided by the cellular network provider. In still a further example, the network services backbone 160 is provided by a third party unrelated to the cellular network provider or the supplier of the UEs 110-114.

The exemplary embodiments relate to the UE 110 performing mobile originating (MO) calls with another UE. In performing the MO call, the VoLTE call may be performed over the LTE-RAN 122 using the IMS 150, when available, and a circuit switched call may be performed through a CSFB procedure over the legacy RAN 120 when the VoLTE call fails. The exemplary embodiments provide a delay mechanism where operations associated with the IMS 150 may be modified so that a circuit switched call may be used in a more efficient manner under irregular network conditions regarding the IMS 150 when attempting to perform VoLTE calls.

Figure 4:
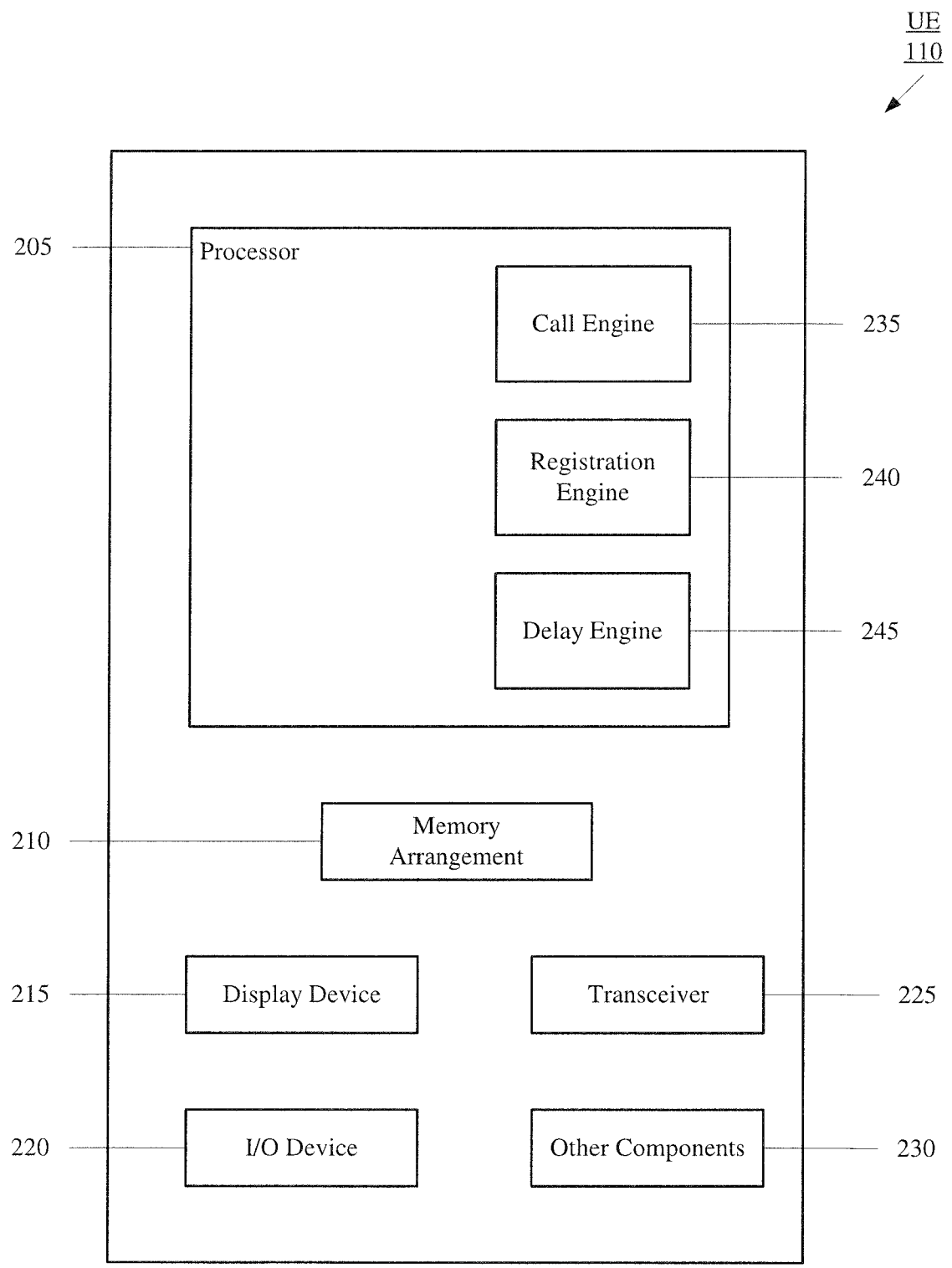
FIG. 4 shows an exemplary user equipment according to various exemplary embodiments described herein.

FIG. 4 shows the UE 110 of the network arrangement 100 of FIG. 3 according to the exemplary embodiments. The UE 110 is configured to execute a plurality of engines that perform functionalities to improve call setup times based on previous results in attempting to perform a call and subsequent settings as a result thereof. It is noted that the UE 110 being configured with the features of the exemplary embodiments is only exemplary. That is, the UE 110 may also represent the UEs 112, 114.

The UE 110 may represent any electronic device that is configured to perform wireless functionalities (e.g., a VoLTE call) and may be representative of one or more of the UEs 110-114 (examples of which are noted above). The UE 110 may include a processor 205, a memory arrangement 210, a display device 215, an input/output (I/O) device 220, a transceiver 225, and other components 230. The other components 230 may include, for example, sensors to detect movement and movement related data, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the engines may include a call engine 235, a registration engine 240, and a delay engine 245. The call engine 235 may be configured to perform a call using a variety of different types of calls based on current conditions indicating availability of the different types of calls. The registration engine 240 may be configured to perform registration operations to register the UE 110 to the IMS 150. The delay engine 245 may be configured to affect the registration engine 240 with regard to when the registration operations may be performed.

It should be noted that the above noted engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications or as part of one or more multifunctional programs. Accordingly, the applications may be implemented in a variety of manners in hardware, software, firmware, or a combination thereof. In addition, in some UEs, the functionality described for the processor 205 is split among two or more processors such as a baseband processor and an applications processor, as will be described in further detail below. The exemplary embodiments may be implemented in any of these or other configurations of a UE.

The memory 210 may be a hardware component configured to store data related to operations performed by the UE 110. For example, the memory 210 may store a contact list (e.g., PTSN numbers) of different contacts with whom a call may be placed. As will be described in further detail below, the memory 210 may also store data associated with instances of timeouts occurring from invites to the IMS 150. The memory 210 may further store data associated with when the instances occur and predefined settings to be used in the mechanism according to the exemplary embodiments (e.g., delay increments, a delay reset time, etc.).

The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to establish a connection with at least one of a base station associated with the legacy RAN 120, a base station of the LTE-RAN 122 (e.g., an evolved Node B (eNB)), a router of a WLAN 124, the UE 112, etc. Accordingly, the transceiver 225 may operate on a variety of different frequencies or channels (e.g., set of consecutive frequencies).

As described above, the exemplary embodiments provide an expedited approach that allows the UE 110 to utilize a circuit switched call when performing a call when the UE 110 is experiencing irregular network conditions that result in the IMS 150 not responding within a window after the UE 110 transmits an invite to perform a VoLTE call. The VoLTE call may be bypassed by deregistering the UE 110 from the IMS 150 when a timeout counter has been met. Thus, the present call may proceed to the CSFB procedure. Furthermore, a delay timer may be started that prevents the UE 110 from registering (or re-registering) with the IMS 150 for the duration of the timer or when a register event is detected. Without registering with the IMS 150, any call that is placed while the delay timer is running is performed as a circuit switched call via the CSFB procedure. With a higher probability that the VoLTE call fails during the delay timer, the call setup time in establishing a call may be reduced to improve a user experience, particularly in view of the waiting time for the IMS 150 being eliminated. The exemplary embodiments are directed to a first set of operations associated with registering with the IMS and a second set of operations associated with performing a call. The first and second set of operations are performed mutually as a result of the first set of operations affecting the second set of operations and vice versa. The first and second set of operations are also based on a call event that indicates a result of attempting to perform a call as a VoLTE call.

The call engine 235 may perform a call using a variety of different types of calls based on current conditions indicating availability of the different types of calls. From the perspective of the user and the UE 110, the call engine 235 may allow an input to be received that indicates that a call is to be performed. From the perspective of network operations, when the UE 110 is registered with the IMS 150, the call engine 235 may perform a call as a VoLTE call. When the UE 110 is not registered with the IMS 150, the call engine 235 may perform a call as a circuit switched call. When the UE 110 performs a VoLTE call but fails to establish the VoLTE call, the call engine 235 may utilize a CSFB procedure in which the call is completed as a circuit switched call. In performing a call, the call engine 235 may perform a plurality of signaling operations such as the process described above with regard to the signal diagrams 100, 200 of FIGS. 1, 2, respectively. The call engine 235 may perform the call for each instance that a user enters an input requesting that the call be performed. As will be described in detail below, the current conditions of the UE 110 may indicate whether the UE 110 is registered with the IMS 150 such that a corresponding type of call is performed.

The registration engine 240 may perform registration operations to register the UE 110 with the IMS 150. The registration engine 240 may also perform a plurality of signaling operations to register the UE 110 with the IMS 150. For example, the IMS registration 10 of the signaling diagrams 100, 200 of FIGS. 1, 2, respectively, may include select registration operations that are performed by the registration engine 240. As will be described in detail below, the registration engine 240 may be configured to perform the registration operations at predefined times, as may be defined by an IMS and/or LTE Specification. However, according to the exemplary embodiments, a registration with the IMS 150 as would be performed by the registration engine 240 may be delayed after completion of a call that is performed as a circuit switched call.

The delay engine 245 may affect the registration engine 240 with regard to when the registration operations may be performed. As noted above, the registration engine 240 may be delayed as to when the registration operations to register the UE 110 with the IMS 150 are performed. The delay engine 245 may define a delay timer that is used to indicate when the registration engine 240 performs the registration operations after completion of a call that is performed as a circuit switched call. The delay engine 245 may also monitor each VoLTE call attempt and track instances that VoLTE call attempts resulted in a timeout. Accordingly, the delay engine 245 may also determine when the delay timer is to be used as well as instruct a deregistration procedure from the IMS 150 to be performed.

As an overall procedure in which the CSFB procedure is available, the mechanism according to the exemplary embodiments provides a change in which an IMS deregistration may be performed and when an IMS registration is to be performed through a timeout counter and a delay timer. Thus, the UE 110 is enabled to establish a call successfully with a reduced call setup time by immediately using the CSFB procedure and bypassing the VoLTE call attempt (when IMS registered at the time a call input is received).

For each call input from a user, the UE 110 may determine whether the UE 110 is registered with the IMS 150. When registered, the UE 110 may attempt a VoLTE call. When not registered, the UE 110 may use the CSFB procedure and attempt a circuit switched call. When registered, the UE 110 may also determine whether the UE 110 has experienced a threshold number (e.g., a timeout counter) of timeout instances from prior calls being performed as VoLTE calls. When the timeout instances are within the threshold number, the UE 110 may proceed in performing the call as a VoLTE call. However, when the timeout instances exceed the threshold number, the UE 110 may deregister with the IMS 150 and use the CSFB procedure to attempt a circuit switched call.

For each call, the UE 110 may also initiate or track a delay timer. When the conditions indicate that the UE 110 is IMS registered and the timeout instances exceed the timeout counter, in addition to deregistering from the IMS 150, the UE 110 may initiate the delay timer. As noted above, the delay timer may prevent the UE 110 from registering with the UE 110 when the IMS registration procedure would otherwise be used. Specifically, after connecting to the LTE-RAN 122 upon completion of a circuit switched call, the UE 110 may not register with the IMS 150 until the delay timer expires. Accordingly, while the delay timer is running, a further call may be performed. However, since the UE 110 is not registered with the IMS 150, the UE 110 may utilize the CSFB procedure where the extended service request is transmitted to the LTE-RAN 122 and proceed immediately with performing the call as a circuit switched call. As will be apparent, a result of performing the call in this manner reduces the call setup time as the operations of the VoLTE call may be avoided including the window that the UE 110 waits for a response from the IMS 150.

The timeout counter and the delay timer may be utilized with various features. The timeout counter may track a number of timeouts over a period of time. For example, the timeout counter may have a threshold set to five timeouts within 15 minutes. The 15 minute span may be a moving window such that a timeout that occurred prior to the 15 minute span from a current time may not be considered. However, the use of a moving window is only exemplary. In another implementation, timeout counter may track a number of timeouts while conditions with the IMS 150 remain unchanged. In a further implementation, a combination of the above manner of using the timeout counter may be used.

The delay timer may have a duration that lasts for a predetermined time period. For example, the delay timer may be set for a network maintenance period. In an exemplary network, the network maintenance period may be 12 hours. Thus, the delay timer may be set for 12 hours. As those skilled in the art will understand, when the UE 110 experiences substantially similar IMS conditions and remains under these IMS conditions, the next change that may be experienced may be due to a network maintenance event. Accordingly, the delay timer may be set to a corresponding value. It is noted that the delay timer being set to a network maintenance period is only exemplary. In another implementation, the delay timer value may be dynamic and correspond to a time when the network maintenance event is to occur. Thus, the delay timer value may be a remaining duration until the network maintenance event. In a further implementation, the delay timer may be set to any other value and/or using any other basis.

The timeout counter may be reset while the delay timer may be stopped based on a respective naturally occurring event and independent events. For example, the timeout counter may constructively be reset when no timeouts are experienced within the time span associated with the timeout counter. In another example, the delay timer may be stopped upon expiry of the duration. In an exemplary independent event, the timeout counter and the delay timer may be reset and stopped, respectively, when an area update is detected. The area update may refer to a tracking area update (e.g., with the LTE-RAN 122) or a location/routing area update (e.g., with the legacy RAN 120). Thus, the naturally occurring event may independently reset or stop the timeout counter or the delay timer, respectively. The independent event may reset and stop the timeout counter and the delay timer, respectively. It is noted that there may be other types of independent events similar to the area update that triggers the timeout counter to be reset and the delay timer to be stopped. Therefore, the area update as used herein may represent any of these events. The exemplary embodiments may be modified to also incorporate these events as considerations in using the timeout counter and the delay timer.

Figure 5:
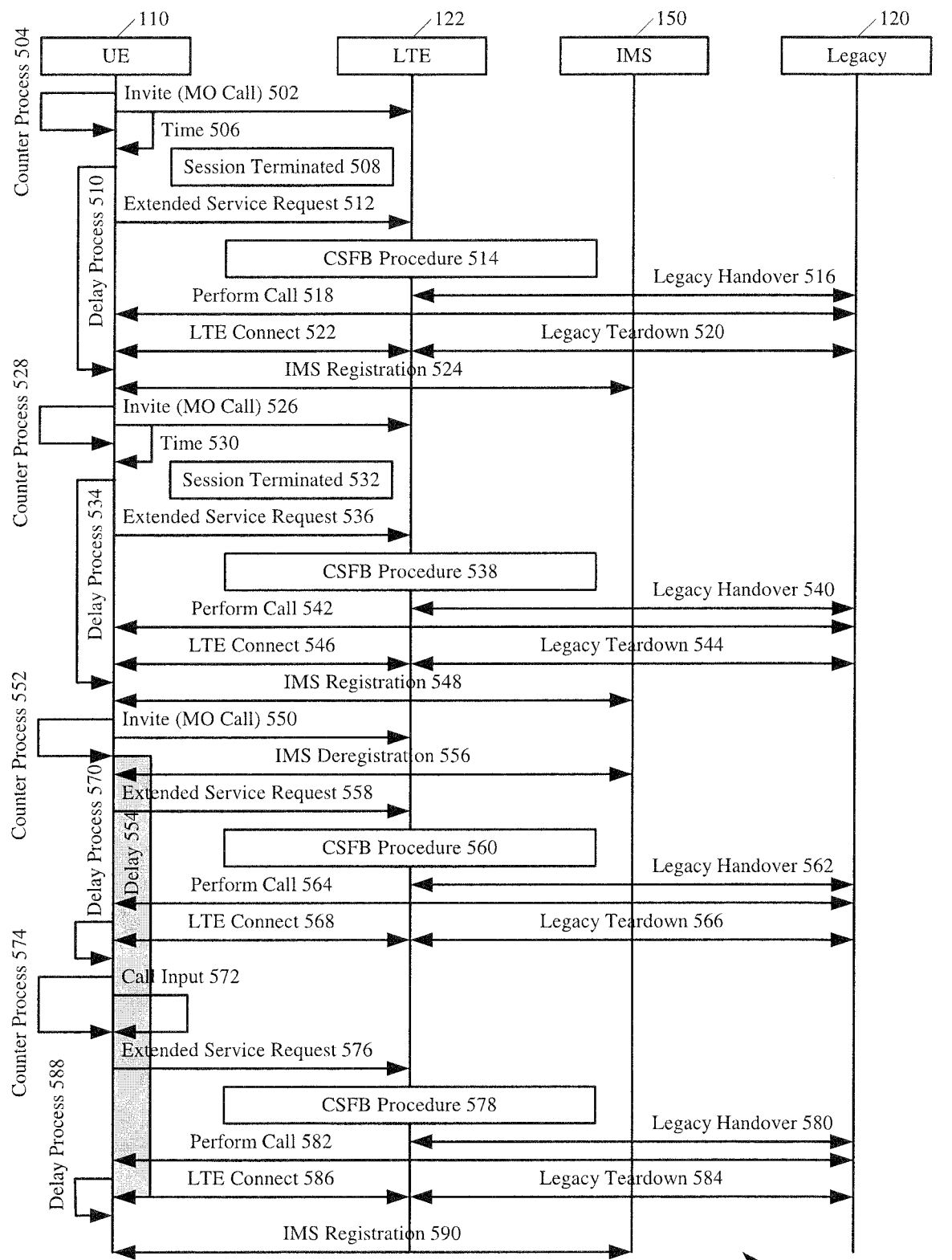
FIG. 5 shows an exemplary signal diagram to improve call setup time according to various exemplary embodiments described herein.

FIG. 5 shows an exemplary signal diagram 500 to improve call setup time according to various exemplary embodiments described herein. The signal diagram 500 is described with regard to the UE 110, the LTE-RAN 122, the IMS 150, and the legacy RAN 120. The signal diagram 500 relates to an exemplary use of the mechanism according to the exemplary embodiments where a timeout counter and a delay timer are used in bypassing operations to attempt a VoLTE call. For illustrative purposes, the exemplary embodiments are described with a threshold for the timeout counter being two timeouts while conditions of the IMS 150 remain unchanged and that no independent events occur. The delay timer may be set to an arbitrary value with regard to the signal diagram 500. It is also noted that the signal diagram 500 is described assuming that the CSFB procedure is available and the SG interface between the legacy RAN 120 and the LTE-RAN 122 is available.

Although not shown, the signal diagram 500 may start in a substantially similar manner as the signal diagrams 100, 200 of FIGS. 1, 2, respectively, where the UE 110 connects to the LTE-RAN 122 and registers with the IMS 150 using an IMS registration procedure. Specifically, a substantially similar process to the IMS registration 10 may be performed in which the UE 110 registers with the IMS 150. Once registered, the UE 110 may perform a call using a VoLTE call when conditions based on the exemplary embodiments allow. Like the signal diagrams 100, 200, the signal diagram 500 shows a direct exchange between the UE 110 and the IMS 150 but that the exchange between the UE 110 and the IMS 150 may include a forwarding functionality performed by the LTE-RAN 122 (not shown).

The signal diagram 500 shows four independent calls being made over time. As noted above, the UE 110 may already be connected to the LTE-RAN 122 and registered with the IMS 150. In a first call, the UE 110 may transmit an invite 502 to the LTE-RAN 122. Initially, a call input may be received from the user. Being connected to the LTE-RAN 122 and registered with the IMS 150, the call input may be transmitted as the invite 502. As with each call, the UE 110 may perform a counter process 504 in determining whether the threshold for the timeout counter has been reached from previous VoLTE call attempts. As this is a first call, the timeout counter may be at 0 instances. Accordingly, the UE 110 may proceed with attempting a VoLTE call for the first call. In attempting the VoLTE call, after the invite 502 is transmitted, the UE 110 may wait for at least a window of time 506 to receive a response from the IMS 150 (e.g., a 100 trying message). As illustrated, the UE 110 may not receive a response from the IMS 150. Thus, the UE 110 may terminate 508 the VoLTE call session. The UE 110 may also perform a delay process 510 where the instance of the timeout is incremented in the timeout counter (e.g., to 1 instance). Therefore, since the session was terminated 508, the UE 110 may transmit an extended service request 512 for the LTE-RAN 122 to perform the CSFB procedure 514. The LTE-RAN 122 and the legacy RAN 120 may perform a legacy handover 516 and the first call may be performed 518 as a circuit switched call using the legacy RAN 120. Once the call is completed, a teardown 520 with the legacy RAN 120 may be performed and a LTE connect 522 operation may be performed (which may be based on reselection or redirection initiated by the LTE-RAN 122). The delay process 510 may further extend until the LTE connect 522 is performed.

Specifically, the delay process 510 may determine whether the delay timer is running. At the conclusion of the first call and after connecting 522 to the LTE-RAN 122, the delay timer is not running. Thus, the UE 110 performs an IMS registration 524.

After the first call, the UE 110 may be connected to the LTE-RAN 122 and registered with the IMS 150. In a second call, the UE 110 may transmit an invite 526 to the LTE-RAN 122. Again, a call input may have been entered and the invite 526 may be used as the UE 110 is registered with the IMS 150. The UE 110 may perform a counter process 528 in determining whether the threshold for the timeout counter has been reached from previous VoLTE call attempts. With the first call resulting in a timeout from the VoLTE call attempt, the timeout counter may be at 1 instance which is under the threshold for the timeout counter. Accordingly, the UE 110 may proceed with attempting a VoLTE call for the first call. In attempting the VoLTE call, after the invite 526 is transmitted, the UE 110 may wait for at least a window of time 530 to receive a response from the IMS 150 (e.g., a 100 trying message). As illustrated, the UE 110 may not receive a response from the IMS 150. Thus, the UE 110 may terminate 532 the VoLTE call session. The UE 110 may also perform a delay process 534 where the instance of the timeout is incremented in the timeout counter (e.g., to 2 instances). Therefore, since the session was terminated 532, the UE 110 may transmit an extended service request 536 for the LTE-RAN 122 to perform the CSFB procedure 538. The LTE-RAN 122 and the legacy RAN 120 may perform a legacy handover 540 and the first call may be performed 542 as a circuit switched call using the legacy RAN 120. Once the call is completed, a teardown 544 with the legacy RAN 120 may be performed and a LTE connect 546 operation may be performed (which may be based on reselection or redirection initiated by the LTE-RAN 122). The delay process 534 may further extend until the LTE connect 546 is performed.

Specifically, the delay process 534 may determine whether the delay timer is running. At the conclusion of the second call and after connecting 546 to the LTE-RAN 122, the delay timer is not running. Thus, the UE 110 performs an IMS registration 548.

After the second call, the UE 110 may be connected to the LTE-RAN 122 and registered with the IMS 150. In a third call, the UE 110 may transmit an invite 550 to the LTE-RAN 122. Again, a call input may have been entered and the invite 526 may be used as the UE 110 is registered with the IMS 150. The UE 110 may perform a counter process 552 in determining whether the threshold for the timeout counter has been reached from previous VoLTE call attempts. For the third call, the timeout counter may be at 2 instances which satisfies the threshold for the timeout counter. Thus, instead of proceeding with attempting the VoLTE call, the UE 110 performs an IMS deregistration 556 to deregister from the IMS 150. The UE 110 may also initiate the delay timer 554. Once deregistered, the UE 110 may proceed to transmitting an extended service request 558 for the LTE-RAN 122 to perform the CSFB procedure 560. The LTE-RAN 122 and the legacy RAN 120 may perform a legacy handover 562 and the first call may be performed 564 as a circuit switched call using the legacy RAN 120. Once the call is completed, a teardown 566 with the legacy RAN 120 may be performed and a LTE connect 568 operation may be performed (which may be based on reselection or redirection initiated by the LTE-RAN 122). A delay process 570 may be performed to determine whether the delay timer is running. At the conclusion of the third call and after connecting 568 to the LTE-RAN 122, the delay timer is running. Thus, the UE 110 does not perform an IMS registration.

After the third call, the UE 110 may be connected to the LTE-RAN 122 but not registered with the IMS 150. In a fourth call, the UE 110 may receive a call input 572 from the user to perform a call. The UE 110 may perform a counter process 574 in determining whether the threshold for the timeout counter has been reached from previous VoLTE call attempts. For the fourth call, the timeout counter may still be at 2 instances which satisfies the threshold for the timeout counter. The counter process 574 may also identify that the UE 110 is not registered with the IMS 150. Thus, the UE 110 may proceed to transmitting an extended service request 576 for the LTE-RAN 122 to perform the CSFB procedure 578. The LTE-RAN 122 and the legacy RAN 120 may perform a legacy handover 580 and the first call may be performed 582 as a circuit switched call using the legacy RAN 120. Once the call is completed, a teardown 584 with the legacy RAN 120 may be performed and a LTE connect 586 operation may be performed. A delay process 588 may be performed to determine whether the delay timer is running. At the conclusion of the fourth call and after connecting 586 to the LTE-RAN 122, the delay timer is running. Thus, the UE 110 does not perform an IMS registration.

At a later time, the delay timer 554 may expire. Based on this event, the UE 110 may determine that, if still connected to the LTE-RAN 122, the UE 110 is to perform an IMS registration 590. Thus, the UE 110 may again attempt to perform VoLTE calls for subsequent call inputs.

It is noted that the delay timer 554 expiring after the conclusion of a call is only exemplary. As the delay timer 554 may be a duration that is triggered upon determining that the timeout counter satisfies a threshold and the arbitrary times at which calls are made by a user, the delay timer may expire during a call. Thus, a delay process that is performed may indicate that the delay timer is not running. Accordingly, at the conclusion of a call during which the delay timer had expired, the UE 110 may perform an IMS registration.

Figure 6:
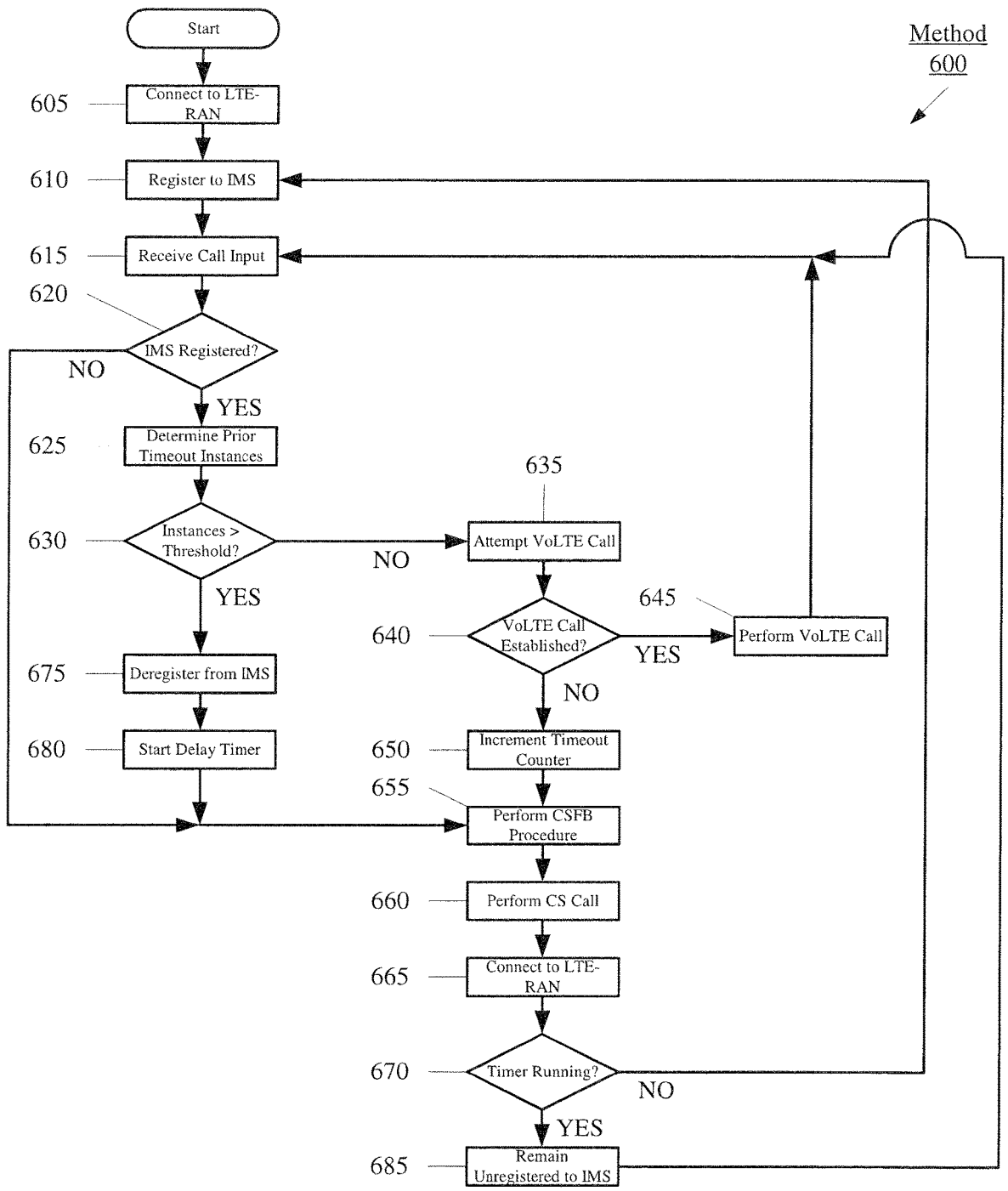
FIG. 6 shows an exemplary method for improving a call setup time in irregular network conditions according to various exemplary embodiments described herein.

FIG. 6 shows an exemplary method 600 for improving a call setup time in irregular network conditions according to various exemplary embodiments described herein. The method 600 may utilize a timeout counter and a delay timer to improve the call setup time by utilizing a CSFB procedure at an earlier opportunity. The method 600 may also eliminate a window associated with attempting a VoLTE call that significantly reduces the call setup time. The method 600 may be performed by the call engine 235, the registration engine 240, and the delay engine 245, and/or other components of the UE 110. The method 600 will be described with regard to the network arrangement 100 of FIG. 3 and the UE 110 of FIG. 4.

In 605, the UE 110 connects to the LTE-RAN 122. Those skilled in the art will understand the various operations that are performed for the UE 110 to associate with a network. Once connected to the LTE-RAN 122, in 610, the UE registers with the IMS 150. As described above, the registration with the IMS 150 may be performed using a plurality of requests that result in the UE 110 being registered with the IMS 150 and being configured to utilize the features that the IMS 150 provides.

At a later time, in 615, the UE 110 receives a call input from a user to place a call to another user using a further UE (e.g., UE 112, 114). The call input may be a selection from a contact list where the selection is associated with a PSTN number that is linked to the further UE. In using the mechanism according to the exemplary embodiments, an initial determination may be performed as to whether the VoLTE call option is available. Thus, in 620, the UE 110 determines whether the UE 110 is registered to the IMS 150. Since the UE 110 has performed 605 and 610, in this pass of the method 600, the UE 110 is registered to the IMS 150.

In 625, the UE 110 may then determine a number of prior timeout instances as being tracked with a timeout counter. In 630, the UE 110 determines whether the number of prior timeout instances is at least a threshold. As noted above, the threshold for the timeout counter may be based on a time window or IMS conditions. For example, the threshold may be 5 timeout instances in a 15 minute time window. In another example, the threshold may be 2 timeout instances while the IMS conditions remain unchanged. Assuming this is a first pass of the method 600 when 605 and 610 are performed, there may not be any prior timeout instances. Thus, the UE 110 continues to 635.

In 635, with the UE 110 being registered with the IMS 150 and the timeout counter being under the threshold, the UE 110 attempts to place the call as a VoLTE call. Specifically, the UE 110 may transmit an invite to the LTE-RAN 122 which is processed by the IMS 150 (if available). In 640, the UE 110 determines whether the VoLTE call has been established. Specifically, the UE 110 may determine whether a response (e.g., 100 trying message) to the invite has been received within an available response window. For example, the response window may be 3,000 ms. If the VoLTE call has been established, the UE 110 continues to 645 where the call is performed as a VoLTE call. Thereafter, upon completion of the call, the UE 110 returns to 615. After performing 645, the UE 110 may remain connected to the LTE-RAN 122 and remain registered to the IMS 150.

If the VoLTE call has not been established and no response from the IMS 150 is received within the response window, the UE 110 continues from 640 to 650. In 650, the UE 110 determines that a timeout instance has occurred and increments the timeout counter. In 655, in view of the VoLTE call attempt failing, the UE 110 transmits an extended service request so that the CSFB procedure may be performed. Thus, in 660, the call is performed as a circuit switched call. As noted above, based on the extended service request, the LTE-RAN 122 may perform a handover to the legacy RAN 120 for the circuit switched call to be performed.

Once the call has completed, in 665, the UE 110 connects to the LTE-RAN 122. For example, a teardown of the connection to the legacy RAN 120 is performed so that the UE 110 may connect to the LTE-RAN 122. Once reconnected to the LTE-RAN 122, in 670, the UE 110 determines whether a delay timer is running. In this pass of the method 600, the delay timer is not running. Accordingly, the UE 110 returns to 610 where the UE 110 registers with the IMS 150.

At a later time, when another call input is received and a plurality of passes of the method 600 are performed, the UE 110 may be registered to the IMS 150 and the timeout counter may indicate that the number of instances of timeouts from attempting VoLTE calls has exceeded the threshold. That is, for the previous calls that are performed, the method 600 may have been performed through 635-655 until a current call where the timeout counter has reached the threshold. Thus, in this next call, in 630, the UE 110 continues from 630 to 675.

In 675, the UE 110 deregisters from the IMS 150. By deregistering from the IMS 150, the UE 110 may bypass performing an attempt of the call as a VoLTE call. Furthermore, in 680, the UE 110 starts the delay timer. As noted above, the delay timer may be set to a network maintenance period of 12 hours or implementation specific. After deregistering from the IMS 150 and starting the delay timer, the UE 110 continues to 655 where the extended service request is transmitted and the CSFB procedure is performed, then to 660 to perform the call as a circuit switched call, and after the call is completed, to 665 where the UE 110 connects to the LTE-RAN 122.

In this pass of the method 600, in 670, the UE 110 may determine that the delay timer is running since the delay timer was started from performing 680. With the timer running, the UE 110 continues from 670 to 685 where the UE 110 connects to the LTE-RAN 122 but remains unregistered with the IMS 150. The UE 110 then returns to 615.

While the delay timer is running and the UE 110 is not registered with the IMS 150 after completing a circuit switched call, a further call input may be received in 615. In this instance, in 620, the UE 110 determines that the UE 110 is not registered with the IMS 150. Thus, the UE 110 continues from 620 to 655 to transmit an extended service request for the CSFB procedure to be performed.

The method 600 may be used for each call input that is received and may proceed based on the conditions being experienced by the UE 110 at the time the call input is received. Thus, when IMS registered and the IMS 150 being responsive, the VoLTE call may be used. When IMS registered and the IMS 150 being unresponsive, the timeout counter may be tracked. When IMS registered and the timeout counter satisfying the threshold, the UE 110 may deregister from the IMS 150, start the delay timer, and immediately perform the CSFB procedure without performing a VoLTE call attempt (e.g., including using a window of time to wait for a response from the IMS 150). When not registered to the IMS 150, the UE 110 may immediately perform the CSFB procedure without performing a VoLTE call attempt as this option is not available. After each completing each circuit switched call and after reconnecting to the LTE-RAN 122, the UE 110 may determine whether the delay timer is still running so that the IMS registration may be performed if the delay timer is not running or remain unregistered with the IMS 150 if the delay timer is running.

The method 600 may be modified to incorporate a LTE-RAN 122 that does not include or utilize the SG interface. That is, the LTE-RAN 122 may not be capable of using the CSFB procedure. Thus, after 640, when the VoLTE call is not established, prior to 650, the method 600 may determine if the LTE-RAN 122 is LTE only or is capable of providing the CSFB procedure. If the LTE-RAN is capable of providing the CSFB procedure, the UE 110 may continue to 650. However, if the LTE-RAN 122 is LTE only, the UE 110 may again attempt to perform the call as a VoLTE call or indicate a failed call.

The method 600 may also include further operations that run independently of the calls being performed.

Specifically, the method 600 may also incorporate operations involved in determining whether the delay timer is to be stopped. For example, the method 600 may incorporate the naturally occurring event that stops the delay timer (e.g., when the delay timer expires). When the delay timer expires, the UE 110 may then perform the IMS registration, particularly when between calls. The method 600 may also incorporate independent events that stop the delay timer. For example, when the UE 110 registers an area update, this event may trigger the delay timer to stop and the IMS registration to be performed, particularly when between calls.

The exemplary embodiments provide a device, system, and method of improving a call setup time. By tracking a number of timeout instances that occur from attempting VoLTE calls, the exemplary embodiments may determine whether a UE is experiencing irregular network conditions that result in continued failures of VoLTE call attempts. Rather than continuing to try to use VoLTE calls, the exemplary embodiments may bypass the VoLTE call attempt and instead use a CSFB procedure to perform the call as a circuit switched call. Accordingly, when the timeout instances reach a threshold, the CSFB procedure may be used while the VoLTE call attempt may be bypassed. Furthermore, upon the timeout instances reaching the threshold, a delay timer may be started that defines a duration of time in which the UE 110 is prevented from registering with the IMS after completion of a circuit switched call. Thus, after a circuit switched call, if the delay timer is running, the UE may reconnect to the LTE-RAN but remain unregistered with the IMS. Any call placed while the delay timer is running and the UE remaining unregistered to the IMS may be performed as a circuit switched call using the CSFB procedure. In using the mechanism according to the exemplary embodiments, the call setup time may be reduced significantly (e.g., reduced by 6 to 8 seconds), thereby improving user performance. Furthermore, the UE may avoid signaling for IMS registrations at each instance that the IMS registration is to otherwise be performed due to a timeout, thereby reducing IMS signaling.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:
1. A method, comprising:
   at a device that is configured to establish a first network connection to a first network and a second network connection to a second network, the second network configured to perform circuit switched voice calls:
   receiving a call input to perform a call;
   determining whether the device is registered with a first feature of the first network, the first feature configured to perform the call based on an Internet Protocol (IP);

when the device is registered with the first feature, determining whether a number of timeouts for attempting previous calls based on the IP is greater than a threshold;

when the number of timeouts is at least the threshold, deregistering from the first feature and starting a delay timer;

performing a circuit switched fallback (CSFB) procedure including a handover from the first network to the second network;

performing the call as a circuit switched call; and reconnecting to the first network when the circuit switched call is completed, wherein the reconnecting comprises determining whether the delay timer is expired and wherein, when the delay timer is not expired, omitting signaling for a registration with the first feature at each instance that the registration is to otherwise be performed due to the number of timeouts such that the device cannot perform calls using the first network.

2. The method of claim 1, wherein, when the device is not registered with the first feature, the method further comprises:
performing the CSFB procedure; and
performing the call as the circuit switched call.

3. The method of claim 1, wherein, when the number of timeouts is less than the threshold, the method further comprises:
performing the call based on the IP.

4. The method of claim 1, wherein the delay timer lasts 12 hours.

5. The method of claim 1, wherein the delay timer is stopped after an area update is detected.

6. The method of claim 1, wherein the threshold is five timeouts within a time period of fifteen minutes relative to a current time.

7. The method of claim 1, wherein the timeout is a failure of receiving a response from the first feature within a time window after an invite is transmitted to the first feature.

8. The method of claim 1, wherein the first network is a Long Term Evolution (LTE) network, wherein the second network is a legacy network, and wherein the first feature is an IP Multimedia Subsystem (IMS), wherein the legacy network comprises one of a Global System for Mobile Communications (GSM) based network or a Universal Mobile Telecommunications System (UMTS) based network.

9. A device, comprising:
a transceiver configured to establish a first network connection to a first network and a second network connection to a second network, the second network configured to perform circuit switched voice calls; and
a processor communicatively coupled to the transceiver and configured to perform operations comprising:
receiving a call input to perform a call;
determining whether the device is registered with a first feature of the first network, the first feature configured to perform the call based on an Internet Protocol (IP);
when the device is registered with the first feature, determining whether a number of timeouts for attempting previous calls based on the IP is greater than a threshold;
when the number of timeouts is at least the threshold, the processor deregistering from the first feature and starting a delay timer;
performing a circuit switched fallback (CSFB) procedure including a handover from the first network to the second network;
performing the call as a circuit switched call; and
reconnecting to the first network when the circuit switched call is completed, wherein the reconnecting comprises determining whether the delay timer is expired and wherein, when the delay timer is not expired, omitting signaling for a registration with the first feature at each instance that the registration is to otherwise be performed due to the number of timeouts such that the device cannot perform calls using the first network.

10. The device of claim 9, wherein, when the device is not registered with the first feature, the processor further performs the CSFB procedure and performs the call as the circuit switched call.

11. The device of claim 9, wherein, when the number of timeouts is less than the threshold, the processor further performs the call based on the IP.

12. The device of claim 9, wherein the delay timer lasts 12 hours.

13. The device of claim 9, wherein the delay timer is stopped after an area update is detected.

14. The device of claim 9, wherein the threshold is five timeouts within a time period of fifteen minutes relative to a current time.

15. The device of claim 9, wherein the timeout is a failure of receiving a response from the first feature within a time window after an invite is transmitted to the first feature.

16. A processor of a device that is configured to establish a first network connection to a first network and a second network connection to a second network, the second network configured to perform circuit switched voice calls, wherein the processor is configured to perform operations comprising:
receiving a call input to perform a call;
determining whether the device is registered with a first feature of the first network, the first feature configured to perform the call based on an Internet Protocol (IP);
when the device is registered with the first feature, determining whether a number of timeouts for attempting previous calls based on the IP is greater than a threshold;
when the number of timeouts is at least the threshold, deregistering from the first feature and starting a delay timer, the delay timer preventing the device from registering to the first feature;
performing a circuit switched fallback (CSFB) procedure including a handover from the first network to the second network;
performing the call as a circuit switched call;
reconnecting to the first network when the circuit switched call is completed, wherein the reconnecting comprises determining whether the delay timer is expired and wherein, when the delay timer is not expired, omitting signaling for a registration with the first feature at each instance that the registration is to otherwise be performed due to the number of timeouts such that the device cannot perform calls using the first network.

17. The processor of claim 16, wherein the first feature comprises a IP Multimedia Subsystem (IMS).

18. The processor of claim 16, wherein the delay timer is stopped after an area update is detected.

19. The processor of claim 16, wherein the threshold is five timeouts within a time period of fifteen minutes relative to a current time.

20. The processor of claim 16, wherein the timeout is a failure of receiving a response from the first feature within a time window after an invite is transmitted to the first feature.

\* \* \* \* \*